April 19, 1949.  M. M. CANNON, JR., ET AL  2,467,809
APPARATUS FOR HOMOGENIZING MOLTEN
GLASS IN FOREHEARTHS
Filed Feb. 15, 1944  3 Sheets-Sheet 2

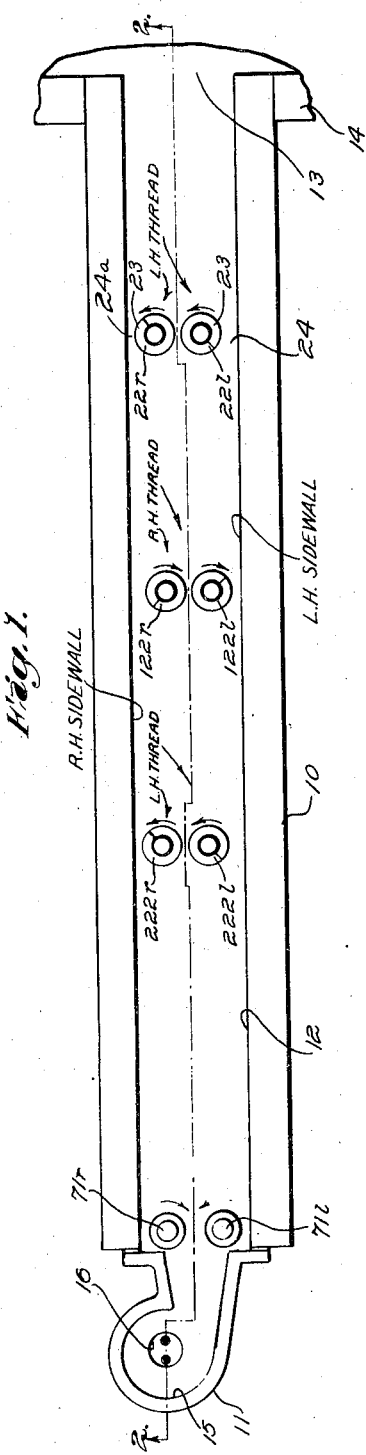
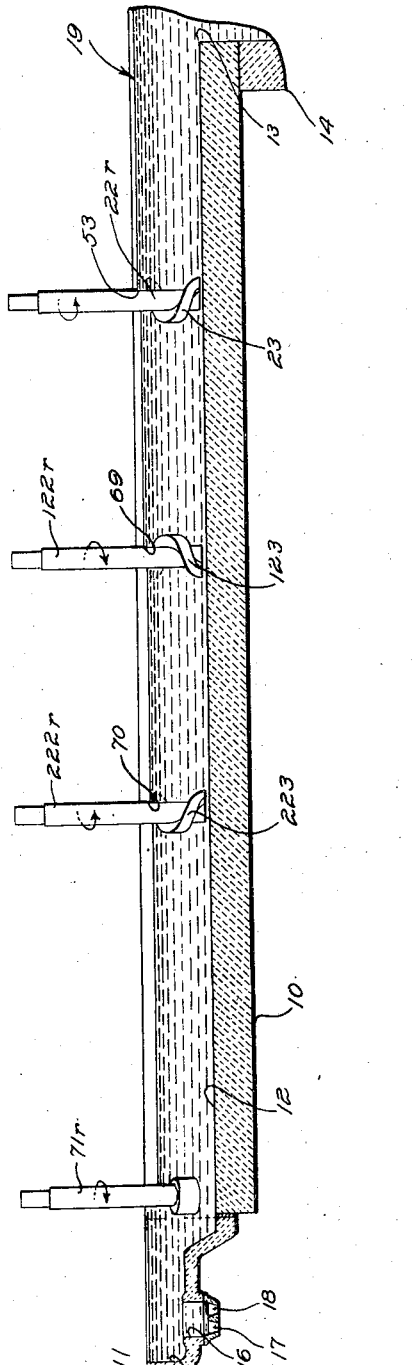

Inventors
Madison M. Cannon Jr.
Karl E. Peiler
by Brown + Parham
Attorneys

Witness

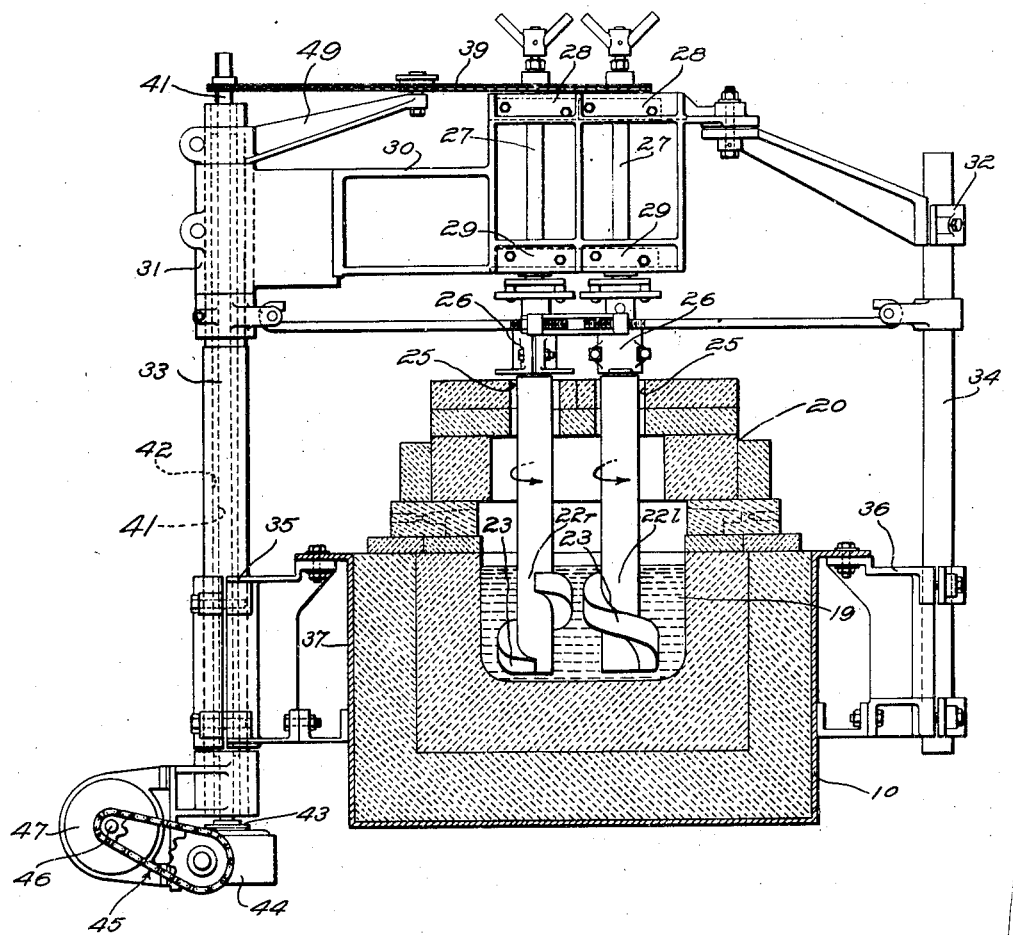

Patented Apr. 19, 1949

2,467,809

UNITED STATES PATENT OFFICE 2,467,809

APPARATUS FOR HOMOGENIZING MOLTEN GLASS IN A FOREHEARTH

Madison M. Cannon, Jr., and Karl E. Peiler, West Hartford, Conn., assignors to Hartford-Empire Company, Hartford, Conn., a corporation of Delaware Application February 15, 1944, Serial No. 522,456

5 Claims. (Cl. 259—6)

This invention relates generally to improvements in apparatus for homogenizing molten glass in a forehearth or other container for glass.

Molten glass in a forehearth tends to be nonuniform in temperature and may be inhomogeneous. The portions of such glass stream or body next to the bottom and side walls of the forehearth tend to be cooler and more sluggish than the remainder of the glass stream or body. The hotter, less viscous glass will flow more rapidly than the cooler, more sluggish, marginal portions of the complete stream or body of glass in a channel formed by the latter. Other factors may cause temperature differences and differences of viscosity between longitudinal portions or component streams of the complete stream or body of glass in the forehearth. Some of the glass in the forehearth may be contaminated by clay that has been eroded and washed from the walls of the forehearth. Different longitudinal portions of the glass stream or body may be of different compositions. Longitudinal streaks or thin streams of contaminated glass or of glass of compositions different from the adjacent glass or of inadequately fused glass ingredients or of other foreign matters tend to persist in the glass stream or body so as to be included in the separate quotas or charges of glass fed from or otherwise removed from the glass delivery portion of the forehearth. In consequence, the quotas or charges of glass obtained are defective and the glass articles made therefrom will likewise be defective and may be unsuitable for the intended use. Such longitudinal streaks or thin streams of refractory-contaminated glass or of any other matter which is different in composition from the adjacent glass constitute "cords" or striae in the glass.

Elimination of cords and equalization of temperature throughout the glass in the delivery portion of a forehearth are problems which long have received the attention of the workers in the glass feeding art. Many forms of stirrers and other implements for acting on the glass in the forehearth have been provided in attempts to cure these defects but the results thereof, so far as known to us, have not been entirely satisfactory.

The present invention contemplates the use of glass stirring and impelling means in the glass in a portion of the forehearth relatively remote from the glass feeding or removal point to eliminate cords or striae therefrom by the time such glass arrives at such point to assure the then substantially cord-free and striae-free glass arriving at that point.

An object of the invention is to provide an effective arrangement of glass stirring and impelling means for eliminating cords or striae from the glass.

Other objects and advantages of the invention will become apparent from or will be particularly pointed out in the following description of a practical embodiment of the invention, as shown in the accompanying drawings, in which:

Figure 1 is a diagrammatic plan view of a forehearth equipped with glass stirring and impelling means of the present invention;

Fig. 2 is a more or less diagrammatic longitudinal vertical section along the line 2—2 of Fig. 1;

Fig. 4 is a transverse vertical section through the forehearth substantially along the line 4—4 of Fig. 3;

Figure 3:
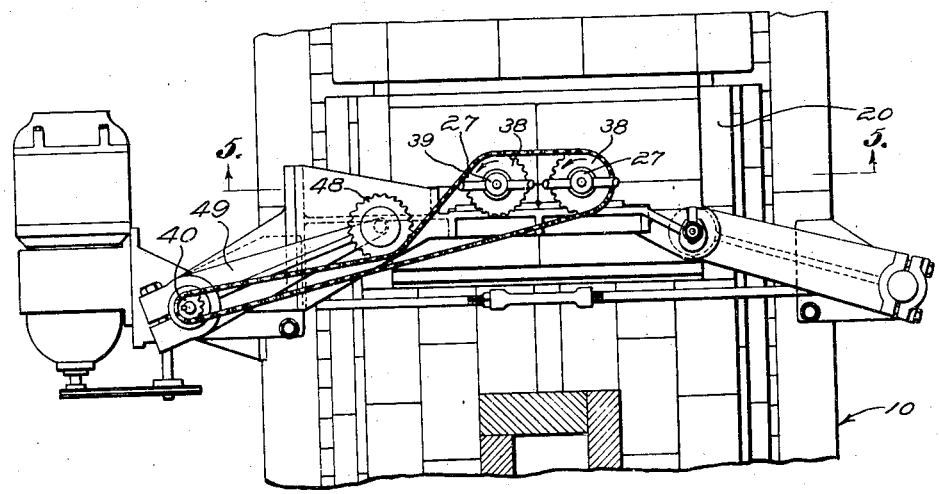
Fig. 3 is a relatively enlarged plan view of a fragmentary portion of the forehearth remote from the delivery end thereof, showing the means for driving a pair of glass stirring and impelling implements which are located in that portion of the forehearth.

In Figs. 1 and 2, a forehearth is shown diagrammatically as comprising a channel section 10 and a glass delivery section 11 at the outer end of the section 10. These sections may be constructed in any suitable known manner and of any suitable known materials. The section 10 is formed to provide a longitudinally extending channel 12 which may be in open communication at its inner end, as at 13, with the interior of a glass melting tank, a fragmentary portion of which is shown in Figs. 1 and 2, as indicated at 14. The channel 12 may also be in open communication at its opposite or outer end with a chamber 15 in the glass delivery section 11 of the forehearth. As shown, the glass delivery section 11 has a well 16 in its bottom portion, located at one side of the longitudinal central line of the forehearth. This well is provided at its bottom with a pair of adjacent bottom outlets 17 and 18, respectively. A body or stream of molten glass, generally designated 19 in Fig. 2, is supplied to the forehearth by the melting tank so as to fill the forehearth channel 12 and the delivery chamber 15 to a predetermined level in the latter. The well 16 and the outlets 17 and 18 are continuously submerged by glass of this body or stream. This outlet structure is intended only as an example of one of various known feeder outlet structures which may be provided. Provision may be made, as by the use of suction gathering molds or receptacles, not shown, to gather glass from the surface of the portion of the supply stream or body in the chamber 15 at a predetermined place in the latter. The particular construction of the delivery end section of the forehearth to adapt it in a known way for either bottom outlet feeding or for suction gathering operations does not, per se, form part of the present invention.

The forehearth channel section 10 may have a suitable cover structure provided therefor, portions of which are indicated at 20 in Figs. 3 and 4. Heating and/or cooling of the molten glass in the forehearth may be effected in any suitable known way and by any suitable known means. The details of any such means or of the forehearth structure, except as herein particularly pointed out, are immaterial so far as the present invention is concerned.

The present invention contemplates action on the glass in the flow channel 12 so as to cause any cords or striae therein to be assimilated by or to unite homogeneously with the surrounding glass by the time such glass arrives at the glass delivery or feed chamber. To this end, I provide a pair of glass stirring and impelling implements 22—r and 22—l, Figs. 1, 4 and 5, in a portion of the channel section of the forehearth remote from the delivery section thereof. See Fig. 1. The implements 22—r and 22—l are shown best in Fig. 4, from which it will be noted that they are alike except for their positions in the forehearth channel. Each of these implements may be a vertically disposed generally cylindrical member provided with a spirally extending glass impelling thread 23 on the portion thereof which is located below the surface of the body or stream 19 of molten glass in the forehearth channel. The thread 23 preferably extends from the level of the bottom end surface of the implement 22—r or 22—l, which is located slightly above the bottom of the flow channel 12, to a level just below the surface of the glass in the forehearth channel, the pitch of the thread or vane being such that it makes one complete revolution of the implement between these levels or, in other words, for its full length.

Figure 5:
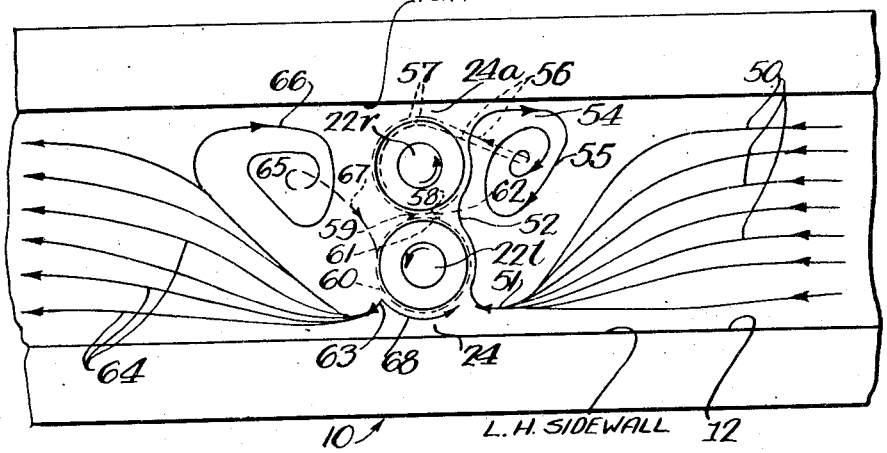
Fig. 5 is a diagrammatic plan view of a fragmentary portion of the forehearth and of a pair of glass stirring and impelling implements therein, the view being generally like a portion of Fig. 1 but on a larger scale and, in addition, showing the action of the pair of glass stirring and impelling implements.

The implement 22—r is disposed relatively close to but out of contact with the right-hand side wall of the flow channel 12, as viewed from the inner or glass receiving end of that channel and so designated in Figs. 1 and 5. Similarly the left-hand side wall of the flow channel is so designated in these same views. The implement 22—l is disposed in closely spaced relation with the implement 22—r. The dimensions of the implements 22—r and 22—l are such in relation to the width of the flow channel 12 that a wider space, indicated at 24 in Figs. 1 and 5, remains between the implement 22—l and the left-hand side wall of the forehearth channel than exists at 24—a between the implement 22—r and the right-hand side wall of the forehearth channel. In other words, a line extending in the direction of length of the forehearth channel midway between the two implements 22—r and 22—l will be located at the right-hand side of the longitudinal center line of the forehearth channel.

The implements 22—r and 22—l may be made of a suitable refractory material or of any other material that is sufficiently resistant to the action of the molten glass and to the high temperature present in the forehearth. As shown in Fig. 4, these implements 22—r and 22—l extend upwardly through the space above the glass in the forehearth channel through suitable apertures 25 in the forehearth cover structure 20 into chucks or clamps 26 by which such implements are operatively connected with the lower ends of rotary vertical shafts 27. The rotary shafts 27 may be supported in vertically fixed positions by suitable vertically spaced upper and lower bearing structures 28 and 29, respectively. These may be carried by a cross head 30 which has its opposite end portions supported at 31 and 32, respectively, on supporting posts or uprights 33 and 34, respectively. These latter, respectively, are located at opposite sides of the forehearth and may be carried by brackets 35 and 36, which respectively, are attached to the opposite sides of an outer casing 37 of the forehearth channel structure.

The shafts 27 carry sprockets 38 on their upper end portions. An endless chain 39 is trained about the sprockets 38 and also extends around a drive sprocket 40 on the upper end of a driven shaft 41 which may extend vertically through a suitably provided journal bore 42 in the supporting upright 33. The shaft 41 is operatively connected at its lower end, as at 43, Fig. 4, with a suitable speed reducing unit 44 which in turn is operatively connected, as by the chain and sprocket transmission mechanism, generally indicated at 45, with the shaft 46 of a motor 47. The chain 39 is kept desirably taut by a chain tightening idle sprocket 48 which is carried on an arm 49 mounted on the upper end portion of the support 33.

The driving arrangement for the implements 22—r and 22—l is such as to rotate these implements counterclockwise, as indicated by the arrows in Fig. 1, 2, 3, 4 and 5. This direction of rotation is related to the positions of the two implements in the flow channel and to the direction of the glass impelling threads 23 thereon, being such that these implements, which have left-hand threads, impel the glass acted upon upwardly as well as angularly around their axes of rotation. The relative angular positions of the implements preferably are such that their cycles of rotation are 180° apart in phase. See Fig. 4.

The action of the stirrers 22—r and 22—l on the glass in the flow channel 12 is indicated in part in the diagrammatic showing of Fig. 5. In that view, glass flow lines spaced across the flow channel are indicated at 50 upstream from these stirrers. As the glass approaches the stirrers, these flow lines tend to veer to the left and to converge, as at 51, at the entrance to the wider space 24 between the left-hand stirrer 22—l and the left-hand side wall of the flow channel. However, the direction of rotation of the left hand stirrer is such as to oppose glass flow through this space. Consequently, the main flow is diverted to the right and transversely across the flow channel, as indicated by the line 52. The level of the glass at the upstream side of the stirrers thus will be raised sharply above that of the glass at the downstream side as more glass is impelled transversely across the flow channel along the line 52 than can pass forwardly through the relatively narrow space 24—a. This is indicated at 53 in Fig. 2.

Also, the action of the stirrers, as and with the results described above and immediately hereafter, will cause a vortex upstream from the right-hand stirrer in the zone indicated at 54, Fig. 5, into which glass will flow as indicated by the clockwise spiral line 55. The direction of travel of glass in this vortex will be downward. From the bottom of the vortex, glass will travel, as indicated by the dot-and-dash lines 56, toward the lower part of the narrow space 24—a between the right-hand stirrer, 22—r, and right-hand side wall of the flow channel and the slight space between the bottom of such stirrer and the bottom of the flow channel.

The direction of rotation of the right hand stirrer is such as to assist forward flow through the relatively narrow space 24—a but the stirrer is placed near enough to the right-hand wall of the flow channel so that most of the glass moving toward this narrow space is forced back into the vortex in the zone 54, as above pointed out. A small amount of the glass, indicated by the dot-and-dash lines at 57, is carried by the stirrer 22—r forwardly through the narrow space 24—a.

The glass carried around the stirrer 22—r by the rotation thereof will move along flow lines which will be divided at the entrance to the space between the two stirrers. One of the divisions of each such flow line will continue close to the stirrer 22—r around the latter, as indicated at 58. The other division of the flow line will be diverted to the periphery of the left-hand stirrer 22—l, as indicated by the arrow 59. The glass passing around the stirrer 22—l, indicated by the dot-and-dash line 60, will likewise be divided at the upstream side of the space between these stirrers, one part, indicated at 61, continuing on around the left-hand stirrer 22—l and the other part, indicated at 62, crossing over to the right-hand stirrer 22—r.

As the glass travels around the stirrers, it follows a helical path upward. From experimentation, we have determined that in the operation of a forehearth having a flow of glass therein such as would be caused by a glass pull of 300 to 400 ounces of glass per minute and a speed of rotation of the stirrers of about 6 R. P. M., each glass flow line will pass around the stirrers at least twelve times before finally working its way to the surface and passing forwardly, as at 63, Fig. 5, away from the stirrers. In other words, each flow line will be divided and sub-divided under these conditions at least 2,048 times. The result is that cords or other concentration of foreign matter in the glass will be attenuated, split up, and drawn out to a fineness such that they may readily be absorbed by or unite homogeneously with the surrounding glass.

The action of the stirrers 22—r and 22—l can be described as a continuous shearing of one flow line element by those adjacent to it, the effect of which is to cause the flow line element to rub or wear off against those adjacent to it which are moving with different velocities. Further, the stirrers act to increase the area of each flow line element and thus the rate of diffusion of that element into those surrounding it by virtue of taking each element and greatly increasing its length and decreasing its diameter. Also, the stirrers take each flow line element and by a tearing action, similar to the unravelling of a yarn made up of continuous filaments, repeatedly divide and sub-divide it so as to increase the exposed area and thus accelerate the diffusing process. Finally, the stirrers positively work on all flow lines in the glass in the flow channel.

It is to be noted further that part of the already stirred glass may pass back into the zone of influence of the stirrers from the downstream side thereof and be recirculated with oncoming glass. As shown in Fig. 5, the glass at the downstream side of the wider space 24 tends to diverge into flow lines which are spaced across the flow channel, as indicated by the lines 64. However, a vortex exists in the zone 65 downstream from the stirrers, as indicated by the clockwise spiral line 66. Some of the already circulated glass will be pulled into this vortex, from which there is a sub-surface flow, indicated by the dot-and-dash line 67, back into the current passing around the left-hand stirrer 22—l. Also, any surface glass coming within the influence of the stirrer 22—l will be directed upstream through the space 24, as indicated by the line 68, and thereafter recirculated by the stirrers. There thus will be a thorough circulation and recirculation of all the glass traveling in the forehearth channel past the stirrers, 22—r and 22—l.

The illustrative stirrers or their operation as hereinbefore particularly described may be modified or varied in ways which will now be obvious to those skilled in the art without departing from the spirit of the invention.

Despite the thorough circulation and recirculation of the glass in the flow channel by the pair of stirrers 22—r and 22—l, further similar treatment of such glass may be necessary or desirable. As shown in Fig. 1, a pair of stirrers 122—r and 122—l is located in the flow channel 12 at a predetermined distance downstream from the stirrers 22—r and 22—l. The stirrers 122—r and 122—l preferably are offset toward the left-hand side of the flow channel. They are rotated clockwise about their axes, this being reverse to the direction of rotation of the stirrers 22—r and 22—l. They are provided with right-hand vanes or threads, as indicated at 123 for the stirrer 122—r in Fig. 2. Still further downstream, another pair of stirrers, 222—r and 222—l is provided. These latter stirrers are offset laterally toward the right-hand side of the flow channel, are rotated counterclockwise, and have left-hand threads or vanes, as indicated at 223 for the stirrer 222—r in Fig. 2.

The stirrers 122—r and 122—l and the stirrers 222—r and 222—l may each be operatively supported and rotated about their respective axes by mechanism such as that shown in Fig. 4 and hereinbefore described as being provided for the stirrers 22—r and 22—l. The action of each pair of stirrers 122—r and 122—l or 222—r and 222—l on the glass coming within the zone of influence thereof will be understood without further explanation since such action is substantially the same as that of the pair of stirrers 22—r and 22—l. It may be noted in this connection that the level of the glass stream or body in the flow channel will be raised at the upstream side of each pair of stirrers, as indicated in Fig. 2 at 69 for the stirrer 122—r and at 70 for the stirrer 222—r.

The glass passing the zone of influence of the last pair of the stirrers will still have a period of travel in the flow channel, during which all traces or remnants of attenuated cords or concentrations of foreign matter which may have existed originally in the glass should be absorbed by and become an indistinguishable part of the surrounding glass. This may be effected by known means or a thorough commingling and further circulation of this glass still may be provided to assure uniformity of temperature throughout the glass in the delivery chamber from which charges or quotas of glass are being fed or otherwise removed. To this end, glass stirring and impelling implements, designated 71—*l* and 71—*r*, respectively, may be located at opposite sides of and equi-distant from the longitudinal center line of the forehearth channel, at the entrance to the delivery chamber 15 to stir the glass entering the delivery chamber. As such means form no part of the present invention further description thereof is unnecessary.

The invention is not limited to the details of the construction and operation of the illustratve emboidment of the invention shown in the accompanying drawings and herein particularly described, as these may be varied and changed in ways which now will be obvious to those skilled in the art.

We claim:

1. In apparatus for improving the quality of a stream of molten glass flowing through a glass feeder forehearth, a flow channel comprising side walls and a bottom, a pair of vertically disposed coacting rotary impellers having screw threads of the same hand on their lower end portions, said impellers being spaced apart transversely of said channel and projecting into said stream from above with their lower ends adjacent to the bottom of said channel and their screw threaded portions in the glass, one of said impellers being located adjacent to and coacting with one side wall of said channel, the other of said impellers being located adjacent to the first impeller and farther from the opposite side walls of said channel than the first impeller from its side wall, and means for rotating the impellers about their axes in the same direction and in unison with each other to impart both vertical and horizontal components of motion to the molten glass and to divide and repeatedly subdivide the glass stream to stretch and intermingle the component parts thereof.

2. In apparatus for improving the quality of a stream of molten glass flowing through a glass feeder forehearth, a flow channel comprising a bottom and side walls, a pair of vertically disposed coacting rotary impellers having screw threads of the same hand on their lower end portions and adapted to engage the molten glass and to impart vertical motion thereto, said impellers being spaced apart transversely of said channel and projecting into said stream from above with their lower ends adjacent to the bottom of said channel and their screw threaded portions in the glass, one of said impellers being located adjacent to and coacting with one side wall of said channel, the other of said impellers being located adjacent to the first impeller and farther from the opposite side wall of said channel than the first impeller from its side wall, and means for rotating the impellers about their axes in the same direction and in predetermined relationship approximately 180° out of phase with each other so the threads come approximately opposite each other at the same levels, whereby the viscous dragging and shearing action of the molten glass between the impellers and between the first impeller and its adjacent side wall imparts both vertical and horizontal components of motion to the molten glass and divides and repeatedly sub-divides the glass stream to stretch and intermingle the component parts thereof.

3. In apparatus for dispersing cords and other inequalities in a stream of molten glass flowing through a glass feeder forehearth, a flow channel having a bottom and side walls, a plurality of vertically disposed coacting rotary impellers having screw threads of the same hand on their lower end portions and adapted to engage the molten glass and to impart vertical motion thereto, said impellers being spaced apart transversely of said channel and projecting into said stream from above with their lower ends adjacent to the bottom of said channel and their screw threaded portions in the glass, one of said impellers being located adjacent to and coacting with one side wall of the channel with a narrow gap therebetween and another of said impellers being farther from the opposite side wall of said channel leaving a wider gap therebetween, and means for rotating the impellers about their axes in the same direction and in unison with each other so that the periphery of the impeller next to the wider gap opposes flow of the stream through said wider gap, and the viscous dragging and shearing action of the molten glass between the impellers and between the first impeller and its adjacent side wall imparts both vertical and horizontal components of motion to the molten glass and divides and repeatedly subdivides the glass stream to stretch and intermingle the component parts thereof.

4. In apparatus for dispersing cords and other inequalities in a stream of molten glass flowing through a glass container, a flow channel having a bottom and side walls, a plurality of vertically disposed coacting rotary impellers having screw threads of the same hand on their lower end portions and adapted to engage the molten glass and to impart vertical motion thereto, said impellers being spaced apart transversely of said channel and projecting into said stream from above with their lower ends adjacent to the bottom of said channel and their screw threaded portions in the glass, one of said impellers being located adjacent and coacting with one side wall of the channel and another of said impellers being adjacent to and coacting with the other side wall of said channel and means for rotating the impellers about their axes in the same direction and in predetermined relationship such that adjacent impellers are approximately 180° out of phase with each other so the threads come approximately opposite each other at the same levels, and the viscous dragging and shearing action of the molten glass between the impellers and between an impeller and its adjacent side wall imparts both vertical and horizontal components of motion to the molten glass and divides and repeatedly subdivides the glass stream to stretch and intermingle the component parts thereof.

5. In apparatus for dispersing cords and other inequalities in a stream of molten glass flowing through a glass container, a flow channel comprising side walls and a bottom, a plurality of vertically disposed coacting rotary impellers having screw threads of the same hand on their lower end portions, said threads comprising approximately a single turn and of such pitch that the length of said threaded end portions approximates the depth of the glass in the channel, the threads being adapted to engage the glass and to impart vertical motion thereto, said impellers being spaced apart transversely of said channel and projecting into said stream from above with their lower ends adjacent to the bottom of said channel and their screw threaded portions submerged in the glass, one of said impellers being located adjacent to each of the side walls of the channel and the impellers adjacent one to another, and means for rotating the impellers about their axes in the same direction and in unison with each other whereby the viscous dragging and shearing action of the molten glass between adjacent impellers and between an impeller and its adjacent side wall imparts vertical and horizontal components of motion to the molten glass and divides and repeatedly subdivides the glass stream to stretch and intermingle the component parts thereof.

MADISON M. CANNON, JR.
KARL E. PEILER.

REFERENCES CITED

The following references are of record in the file of this patent:

UNITED STATES PATENTS

| Number | Name | Date |
| --- | --- | --- |
| 1,414,008 | Brown | Apr. 25, 1922 |
| 1,479,511 | Parsons | Jan. 1, 1924 |
| 1,608,710 | Morrison | Nov. 30, 1926 |
| 1,988,783 | Canfield | Jan. 22, 1935 |
| 2,061,367 | Morton | Nov. 17, 1936 |
| 2,115,408 | Brosse | Apr. 26, 1938 |
| 2,189,271 | Rowe | Feb. 6, 1940 |
| 2,196,983 | Dibble et al. | Apr. 16, 1940 |
| 2,217,182 | Peiler | Oct. 8, 1940 |
| 2,230,608 | Canfield | Feb. 4, 1941 |
| 2,238,800 | Mueller | Apr. 15, 1941 |